United States Patent
Simonsohn et al.

(10) Patent No.: US 11,695,265 B2
(45) Date of Patent: Jul. 4, 2023

(54) HEAT SHRINK COMPONENT WITH HEAT SPREADING LAYER, AND METHOD OF ASSEMBLY A HEAT SHRINK COMPONENT

(71) Applicant: Tyco Electronics Raychem GmbH, Ottobrunn (DE)

(72) Inventors: Thilo Simonsohn, Munich (DE); Christian Heindl, Munich (DE)

(73) Assignee: Tyco Electronics Raychem GmbH, Ottobrunn (DE)

( * ) Notice: Subject to any disclaimer, the term of this patent is extended or adjusted under 35 U.S.C. 154(b) by 531 days.

(21) Appl. No.: 16/741,884

(22) Filed: Jan. 14, 2020

(65) Prior Publication Data

US 2020/0153224 A1 May 14, 2020

Related U.S. Application Data

(63) Continuation of application No. PCT/EP2018/068165, filed on Jul. 5, 2018.

(30) Foreign Application Priority Data

Jul. 14, 2017 (EP) ...................... 17181400

(51) Int. Cl.
*H02G 15/18* (2006.01)
*B29C 61/00* (2006.01)
(Continued)

(52) U.S. Cl.
CPC ....... *H02G 15/1806* (2013.01); *B29C 61/003* (2013.01); *B29C 61/0625* (2013.01); *B29C 65/34* (2013.01); *B29C 65/68* (2013.01)

(58) Field of Classification Search
None
See application file for complete search history.

(56) References Cited

U.S. PATENT DOCUMENTS

| 2,027,962 A | 1/1936 | Currie |
| 3,086,242 A | 4/1963 | Cook et al. |
(Continued)

FOREIGN PATENT DOCUMENTS

| DE | 1941327 A1 | 9/1970 |
| DE | 2410289 A1 | 9/1975 |
(Continued)

OTHER PUBLICATIONS

Description with paragraph Nos. from EPO for EP0008912, Accessed Mar. 29, 2022 (Year: 1980).*

(Continued)

*Primary Examiner* — Jacob T Minskey
*Assistant Examiner* — Adrianna N Konves
(74) *Attorney, Agent, or Firm* — Barley Snyder (57) ABSTRACT

A heat shrink component includes a heat shrink layer and a heating unit in thermal contact with at least a part of the heat shrink layer and heating the heat shrink layer to a heat shrink temperature. The heat shrink component has a first dimension in an expanded state and a second dimension in a shrunk state after heating, the first dimension is larger than the second dimension. The heating unit includes an electrically conductive lead heated by an electrical current flowing through the electrically conductive lead and a heat spreading layer arranged in thermal contact with the electrically conductive lead and distributing a heat generated by the electrically conductive lead.

20 Claims, 9 Drawing Sheets

(51) Int. Cl.
*B29C 61/06* (2006.01)
*B29C 65/34* (2006.01)
*B29C 65/68* (2006.01)

(56) References Cited

U.S. PATENT DOCUMENTS

| | | | |
|---|---|---|---|
| 4,421,582 A | 12/1983 | Horsma et al. | |
| 6,093,960 A * | 7/2000 | Tao | H01L 23/4334 |
| | | | 257/796 |
| 2012/0281363 A1* | 11/2012 | Smith | F28F 13/00 |
| | | | 165/185 |

FOREIGN PATENT DOCUMENTS

| | | | | |
|---|---|---|---|---|
| EP | 0008912 A1 | 3/1980 | | |
| EP | 0798099 B1 | 10/2000 | | |
| EP | 1190839 B1 | 6/2004 | | |
| FR | 2512394 A1 | 3/1983 | | |
| GB | 1266422 A * | 3/1972 | | C09D 177/00 |
| WO | 0219494 A1 | 3/2002 | | |

OTHER PUBLICATIONS

PCT Communication, Notification, Written Opinion of the International Searching Authority and International Search Report, International App. No. PCT/EP2018/068165, dated Jun. 18, 2019, 13 pages.
EPO Communication pursuant to Article 94(3) EPC, Application No. 17 181 400.7-1201, dated Sep. 18, 2020, 7 pp.

* cited by examiner

HEAT SHRINK COMPONENT WITH HEAT SPREADING LAYER, AND METHOD OF ASSEMBLY A HEAT SHRINK COMPONENT

CROSS-REFERENCE TO RELATED APPLICATIONS

This application is a continuation of PCT International Application No. PCT/EP2018/068165, filed on Jul. 5, 2018, which claims priority under 35 U.S.C. § 119 to European Patent Application No. 17181400.7, filed on Jul. 14, 2017.

FIELD OF THE INVENTION

The present invention relates to a heat shrink component and, more particularly, to a method of assembling a heat shrink component.

BACKGROUND

Heat shrink components are articles made from material which shrinks from an expanded state into a shrunk state with much smaller dimensions by applying a sufficient amount of heat. Heat shrink components are widely spread as joint sleeves or other cable accessories.

A heat-recoverable article (an independently dimensionally heat-unstable article) can function as a heat shrink layer. In general, such an article is made of a material capable of having the property of elastic or plastic memory imparted thereto which is heated to a certain temperature and distorted under pressure to a configuration different from its normal configuration and then cooled while kept under pressure. If the article is made of a material which is wholly or partly crystalline, is at least partly cross-linked in the amorphous areas, and is distorted at a temperature at or above the crystalline melting point of the material, the article will have elastic memory. An article with elastic memory will not recover towards its original configuration until it is again heated at least to its crystalline melting temperature. If the article is made of a non-crystalline material, it is heated to a temperature at which the article can be distorted by pressure, and the distorted article then has the property of plastic memory. Examples of heat-recoverable materials are found in U.S. Pat. Nos. 2,027,962 and 3,086,242. Of course the heat shrink layer can be fabricated from any suitable material, as this is known to a person skilled in the art. Moreover, also multilayer arrangements can additionally comprise elastic and/or electrically semi-conductive and conductive layers.

In order to install heat shrink products for low-voltage ("LV"), medium-voltage ("MV"), and high-voltage ("HV") applications, typically open flames, such as gas torches, are used. More rarely, also hot air guns with several kilo watt ("kW") of power are employed. Hot air guns, however, are limited to thin walled products, like LV sleeves and molded parts with a low wall thickness in the range of 1 to 4 mm. For instance for electronic applications, where sleeves typically have wall thicknesses below 1 mm in the expanded state, hot air guns or tunnel heaters with ceramic radiation features are commonly used.

From the perspective of safety, the use of open flames is disadvantageous. Furthermore, it is desired to reduce the amount of energy needed for installing products. In some cases it is also desired to reduce the amount of heat generated during installation. Consequently, it is desirable to use other energy sources than open flames, preferably electrical energy.

It is known to shrink heat shrinking products by adding at least one layer to the product that transforms electrical energy into heat. From DE 1941327 A1, an electrically conductive heat-recoverable article is known which recovers by passing an electrical current through the article to raise it to its recovery temperature. The conductive article, e.g. a tubular sleeve, is placed in good heat-transfer relationship to an electrically non-conductive heat recoverable member, e.g. a tubular sleeve, so as to act as heater for this non-conductive member, the two members recovering substantially simultaneously. The conductive material of the sleeve is carbon-black filled cross-linked polyethylene which is made heat-recoverable. Other cross-linked polymers, non-crystalline polymers such as polyurethane and ionomers, as well as elastomers such as silicone rubber are disclosed. A conductive sleeve is surrounded by two insulating sleeves, or a slit conductive sleeve surrounds a heat-recoverable non-conductive sleeve and is peeled away after the non-conductive sleeve is fully recovered. Electrical connections to the conductive sleeves are established via alligator clips or other conventional clamps or electrodes.

However, these known arrangements suffer from the disadvantage that the time for performing the installation is usually greater than 15 minutes and therefore too long to be cost effective.

Furthermore, it is known to provide heating systems with fluid pipes in order to prevent fluid conducted by the pipes from freezing. These defrosting systems, however, allow only maximum temperatures of about 60 to 80° C. and are therefore not applicable for shrinking heat shrink products which require temperatures above 120° C.

Outside the field of energy technology, it is known to use electrical heating for jointing pipes using thermoplastic coupling parts. As for instance disclosed in European patents EP 1190839 B1 and EP 0798099 B1, a molded part with embedded wires is positioned over the end portions of the two pipes to be joined. An electronic drive system linked to a power source then generates sufficient heat to melt the ends of the pipes which then are welded with each other and/or the molded part. For this field of application, the pipes essentially do not change their original diameter and each joint component is only used for one particular diameter of pipes. When applying such a system to a heat shrink component which usually undergoes a diameter reduction of around 10% to 75% of the expanded diameter during the heat shrink process, the molded part would lose mechanical contact to the heat shrink product.

Finally, there exist multiple heating systems in the art which are based on resistance wires. These wires are made from special metal alloys that have resistance values which are about 10 to 100 times higher than those of copper or aluminum. The disadvantage of using resistance heating wires can be seen in the fact that these standard resistance heating wires have a high specific resistance and therefore provide a high density of dissipated heat energy, so that for reaching a temperature of 120° C. and higher by applying a voltage of about 24 V, only a short length of wire is needed. This rather short wire length causes severe problems to properly distribute the heat over the entire surface and volume of a typical heat shrink product such as an MV joint body. In addition, the costs of heating wires are much higher than of for instance copper wire.

Moreover, it was found that when using wires for heating up the heat shrink material within the allowed time (e.g. 10 min for a thicker walled MV joint body), they may have temperatures of 150° C. or higher, sometimes even to 450° C. In these cases, the direct contact of the hot wires may cause the heat shrink material to fail due to material degradation. For instance, splitting of a heat shrink sleeve or the destruction of thin superficial conductive layers on the heat shrink sleeve may occur, resulting in electrical failure once the cable accessory is energized. Thus, it has to be ensured that heating wires can be operated to generate high temperatures, at the same time avoiding harming the heat shrink component.

Apart from avoiding temperature peaks and local overheating at the electrically conductive leads, a fast and even energy input towards the heat shrink material is of utmost significance for achieving the short shrinking durations that are required to be market competitive. In particular, a fast and even shrinkage of an essentially tubular heat shrink component around its entire circumference has to be ensured. Heat shrink cable accessories change their diameter by large degrees in the course of their installation process in order to conform to various cable diameters. These range taking properties strongly influence the heating system. An even shrinkage is important for cable accessories in order to close axial interfaces of joints and terminations. If the heat shrink product is a sleeve that has the purpose of sealing against the environment, an even shrinking is needed for instance to melt a hot melt arranged on the inside of the sleeve and to soften the sleeve itself in order to allow for a proper sealing.

An even shrinkage around the circumference can happen during two major phases: firstly, when heating up the heat shrink component and during its visible shrinking, and secondly, after the heat shrink product has essentially shrunk onto the substrate. The latter is about consolidation of uneven heating.

When using standard gas torches, heat may be applied so unevenly that the product may shrink down and sit on the cable, but one side may have remained cold. Especially hot melt sealants or electrically active layers on the inside of terminations may not be sufficiently heated up, resulting in electrical failure or leakages and water ingress.

SUMMARY

A heat shrink component includes a heat shrink layer and a heating unit in thermal contact with at least a part of the heat shrink layer and heating the heat shrink layer to a heat shrink temperature. The heat shrink component has a first dimension in an expanded state and a second dimension in a shrunk state after heating, the first dimension is larger than the second dimension. The heating unit includes an electrically conductive lead heated by an electrical current flowing through the electrically conductive lead and a heat spreading layer arranged in thermal contact with the electrically conductive lead and distributing a heat generated by the electrically conductive lead.

BRIEF DESCRIPTION OF THE DRAWINGS

The invention will now be described by way of example with reference to the accompanying Figures, of which.

DETAILED DESCRIPTION OF THE EMBODIMENT(S)

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art. Furthermore, several aspects of the embodiments may form—individually or in different combinations—solutions according to the present invention. The following described embodiments thus can be considered either alone or in an arbitrary combination thereof.

The term "high-voltage" as used in the following is intended to relate to voltages above approximately 1 kV. In particular, the term high-voltage is intended to comprise the usual nominal voltage ranges of power transmission, namely medium voltage, MV, (about 3 kV to about 72 kV), high-voltage, HV, (about 72 kV to about 245 kV), and also extra high-voltage (up to presently about 500 kV). Of course also higher voltages may be considered in the future. These voltages may be direct current (DC) or alternating current (AC) voltages. In the following, the term "high-voltage cable" is intended to signify a cable that is suitable for carrying electric current of more than about 1 A at a voltage above approximately 1 kV. Accordingly, the term "high-voltage accessory" is intended to signify a device that is suitable for interconnecting high-voltage facilities and/or high-voltage cables. In particular, a high-voltage accessory may either be an end termination or a cable joint. The present invention is also applicable to the so-called "low-voltage", LV, range that relates to voltages below 1 kV. The principles of the present invention may further be applied to heat shrink products used for electronic applications.

When referring to a "layer" in the following, it is not intended to mean that the object underneath has to be covered completely by the layer.

Figure 1:
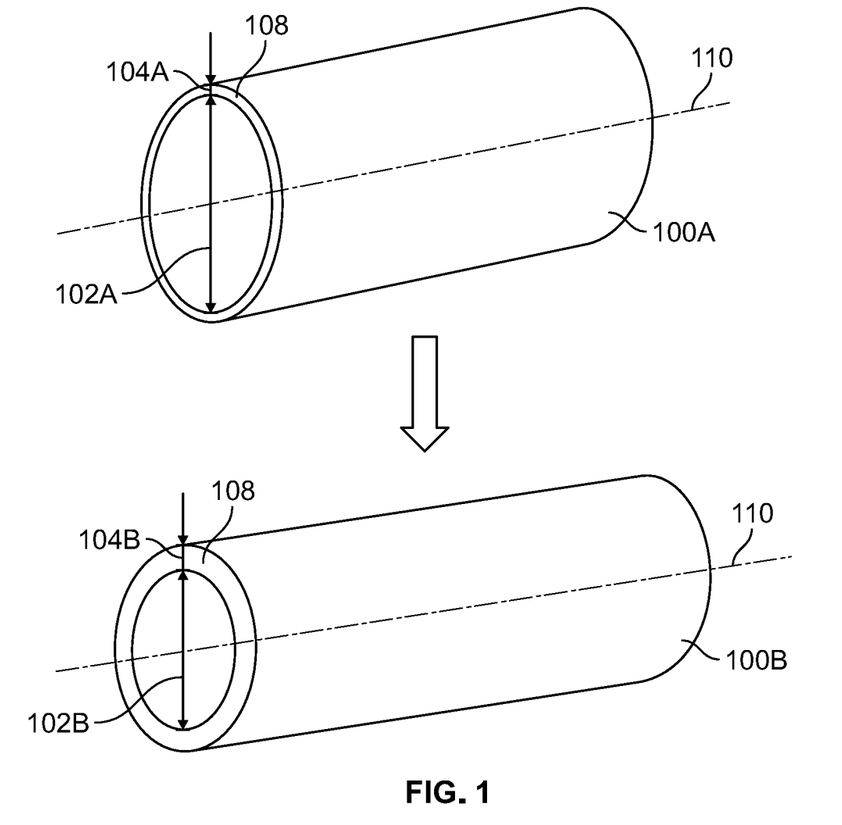
FIG. 1 is a schematic diagram of a heat shrinking process of a heat shrinkable joint sleeve.

A heat shrinking process of heat shrinkable joint sleeve 100A, 100B is shown in FIG. 1. The heat shrink sleeve is in the expanded state 100A where it has first dimensions. The heat shrink sleeve in the expanded state 100A has an inner diameter 102A which is larger than the outer diameter of a component to be covered and a wall thickness 104A that is thinner than in the finally mounted state. By applying heat, the heat shrink sleeve is transformed from the expanded state 100A into a heat shrink sleeve in the shrunk state 100B (indicated by the arrow). In order to be shrunk under the influence of heat, the sleeve 100 has a heat shrink layer heat.

A heat-recoverable article (an independently dimensionally heat-unstable article) is used as the heat shrink layer 108. In various embodiments, the heat shrink layer 108 can be fabricated from any suitable material. In other embodiments, the multilayer arrangements additionally comprise elastic layers. Heat shrink layers 108 and/or elastic layers may comprise electrically insulating and/or electrically semi-conductive and/or conductive layers or components.

As shown in FIG. 1, the shrunk sleeve 100B has an inner diameter 102B that fits tightly over the covered component and a larger wall thickness 104B as compared to the expanded state 100A. The heat shrink process leads to a reduction of diameter 102B of up to 75% of the diameter 102A in the expanded state 100A. The principles according to the present invention can be applied to straight tube shaped sleeves 100 as well as to differently shaped covers for branch joints, elbows, bends, and the like. The component onto which the sleeve 100 is shrunk may be cylindrical or it may have regions with a cross-section that is polygonal and/or that is varying along the longitudinal axis of the component.

The heat shrinking step is performed by applying electrical energy via electrically conductive leads 106 with an electrical conductivity of more than $1 \cdot 10^7$ S/m and, in an embodiment more than $3 \cdot 10^7$ S/m, which comprise copper and/or aluminum. In an embodiment, the electrically conductive lead 106 comprises copper and has an electrical conductivity greater than $4 \cdot 10^7$ S/m.

FIGS. 2-5 illustrate examples of how the electrically conductive leads 106 that form a heating unit 120 can be arranged on a heat shrink product. The leads 106 may be positioned with direct contact to a heat shrink layer or may be positioned on a layer of non-shrink material, such as an elastomeric layer or a thermoplastic layer. Terminals are led to the outside for connecting a power source, such as a battery supplying a DC voltage of, for example, 24 V. In an embodiment, the power source provides a DC voltage below 60 V or an AC voltage of 25 V root mean squared ("RMS").

A length of the electrically conductive lead 106 is determined by a diameter and a resistance value that is to be reached and amounts to around 1 to 15 m when choosing a diameter in a range of 0.1 mm to 0.4 mm. The resulting overall resistance of such heating units 120 may for instance be in a range of $0.3\Omega$ to $6.0\Omega$ at 23° C.

Figure 2:
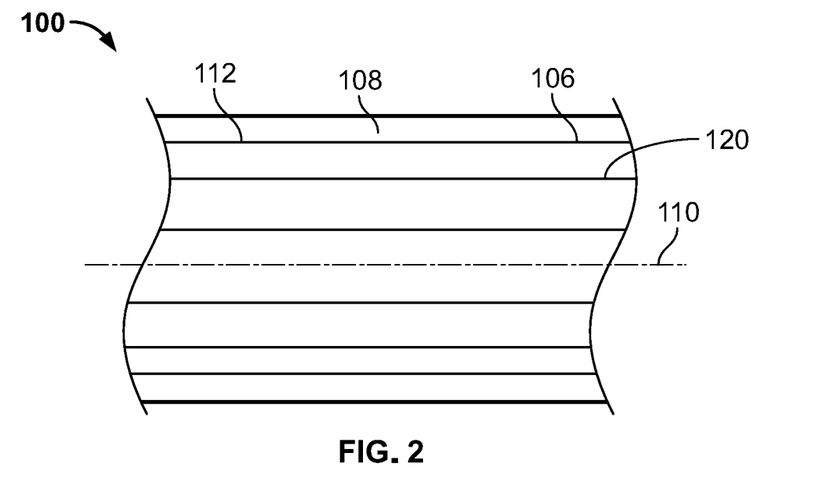
FIG. 2 is a schematic diagram of a heating unit according to an embodiment.

In the embodiment shown in FIG. 2, a plurality of elongated wire sections 112 are arranged in parallel to a longitudinal axis 110 of the heat shrink sleeve 100. The individual wire sections 112 may be serially interconnected in the fashion of a meandering structure to form one continuous electrical lead 106. Additionally, some of the longitudinal sections 112 may be interconnected to form an elongated closed loop, a plurality of those loops being interconnected in parallel. The sections 112 may either be arranged on an outer surface or on an inner surface of the heat shrink sleeve 100. The sections 112 may also be covered by further layers. The sections 112 may also be arranged in different planes with respect to the center line 110.

Arranging the wire sections 112 in parallel to the longitudinal axis 110 of the heat shrink sleeve 100 is also advantageous from an electro-physical point of view because undesired coil structures can be avoided. If necessary, the loops of wire interconnecting the wire sections 112 for providing a closed path for the current may be arranged at the periphery of the sleeve 100 in a way that they can be cut off after the shrinking process is completed, leaving in place only the longitudinal wire sections.

The embodiment shown in FIG. 2 having the longitudinal wire sections 112 has the advantage that, upon shrinking of the heat shrink layer 108, the wire sections 112 become arranged closer to each other, but are not significantly deformed or dislocated. If the covered component has a polygonal cross-section and/or has dimensions that vary along the longitudinal axis, the wire sections 112 conform to this outer silhouette to some extent. Still, no sharp edges or disruptions during the heat shrinking process can occur. This means that separations or areas of increased resistance due to strong deformation of the wires are less likely.

Figure 3:
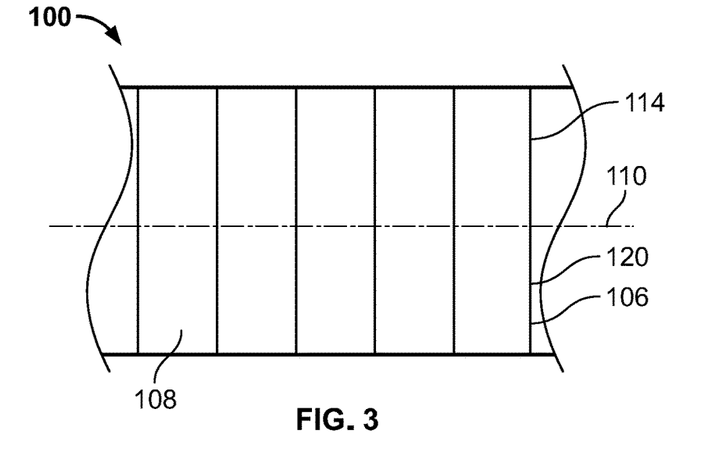
FIG. 3 is a schematic diagram of a heating unit according to another embodiment.

In an embodiment shown in FIG. 3, a plurality of ring-shaped wires 114 are arranged on the sleeve 100 to form the electrically conductive lead 106. These ring-shaped wires 114 are arranged equidistantly along the longitudinal axis 110 and are essentially perpendicular to the longitudinal axis 110. In other embodiments, the ring-shaped wires 114 can also be arranged with varying distances between each other. Moreover, when using an elliptical shape instead of a circular geometry, the rings 114 can also be arranged to include an angle other than 90° with the longitudinal axis 110. The rings 114 may electrically be connected in series and/or in parallel. For a serial connection, the rings 114 may not be entirely closed around the circumference of the heat shrink sleeve 100.

Figure 4:
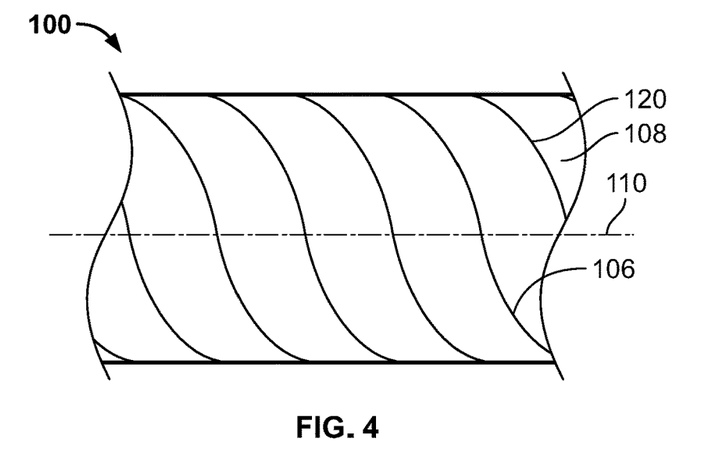
FIG. 4 is a schematic diagram of a heating unit according to another embodiment.

In an embodiment shown in FIG. 4, one continuous electrically conductive lead 106 is wound in a helical configuration around the heat shrink layer 108. This configuration is particularly easy to assemble.

Figure 5:
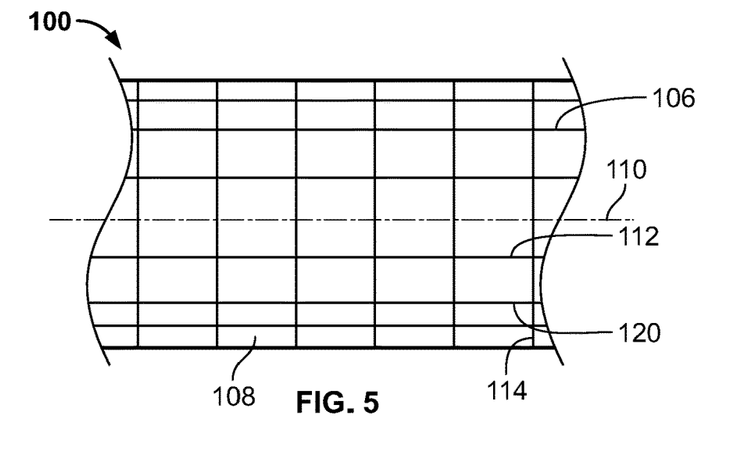
FIG. 5 is a schematic diagram of a heating unit according to another embodiment.

The above-described arrangements according to FIGS. 2-4 can also be combined with each other as is exemplarily depicted in FIG. 5. In the embodiment of FIG. 5, one layer of longitudinal sections 112 is combined with one layer of ring-shaped wires 114, wherein it is arbitrary which layer is the top layer and which one the bottom layer. In another embodiment, more than two layers can be combined to form a heating unit. Electrically, these layers may either be connected in parallel or serially. Advantageously, the wires 112, 114 in the different layers are to be electrically insulated against wires 112, 114 of another layer. This may be achieved by using wires 112, 114 that are individually covered with an electrical insulation and/or by arranging an insulating material between adjacent layers of wire 112, 114.

Figure 6:
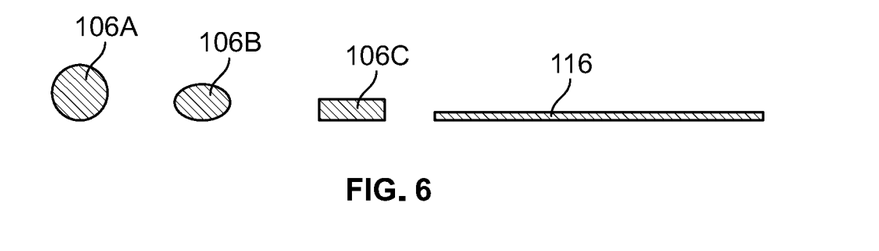
FIG. 6 is a sectional end view of a plurality of electrically conductive leads.

Several examples of electrically conductive leads 106 are shown in FIG. 6. An electrical resistance suitable for generating temperatures around 120° C. and up to 450° C. from safety voltages (e. g. 24 V DC) can also be realized with a highly conductive material when reducing the cross-sectional area and/or enhancing the length accordingly. The cross-section of the wires 106 may be circular (electrically conductive lead 106A), elliptic (electrically conductive lead 106B), or polygonal (electrically conductive lead 106C). Furthermore, the electrically conductive lead may also be formed by a thin film 116. It should be noted that the drawings are not exactly to scale throughout the Figures; in particular, the thickness of the electrically conductive film 116 is exaggerated.

The electrically conductive film 116 shown in FIG. 6 may, for instance, be formed from a metallization layer that is etched by a photolithography process. Alternatively, also screen printing or other printing techniques can be used for depositing the electrically conductive film 116 on the heat shrink layer, or on an additional layer, i. e. a thermoplastic film.

Figure 7:
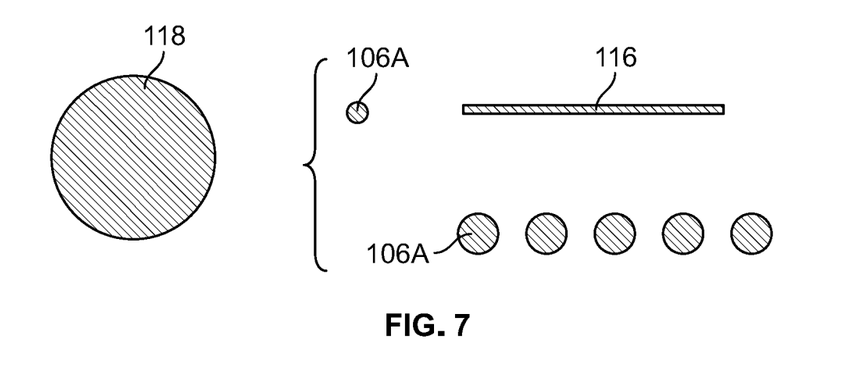
FIG. 7 is a sectional end view of a plurality of electrically conductive leads.

The electrical resistance of the electrically conductive lead 106 will now be described in greater detail with reference to FIG. 7. FIG. 7 shows arrangements that have the same electrical resistance, leading to the same heating effect when powered with the same voltage. In particular, the cross section of a standard resistance heating wire 118 is compared to a copper wire 106 or an electrically conductive copper film 116. When assuming that the copper wire 106A and the electrically conductive film 116 have only 1% of the specific resistance of the resistance wire 118, they need to have a cross sectional area of only 1% of the cross-sectional area of the resistance wire 118 in order to provide the same overall resistance for a piece of lead having the same length. Alternatively, a copper wire 106A having 20% of the cross-sectional area of the resistance wire 118 has the same resistance as the resistance wire 118, if the copper wire 106A has 5 times the length of the resistance wire 118.

Due to economic and reliability considerations, the number and diameter of the heating wires 106 needs to be within certain limits. If the wires 106 have very small diameters, their numbers and/or length need to be reduced. Otherwise, the resistance increases too much and voltages of 24 V or below cannot generate a sufficiently high current to heat up the wires 106 to temperatures of at least 110° C. On the other hand, if the wires 106 have too large cross-sections, their resistance may become too low. Then the length has to be increased, in order to increase the resistance. Otherwise, the wires 106 would not be heated up sufficiently. Thereby costs are increased. A further option is to use (at least in particular areas of the heat shrink component) two or more electrical circuits of heating wires which are connected in parallel. The electrical current then splits up according to the relative resistance of the circuits. This allows choosing wires 106 with smaller cross-sections, while achieving the same resulting resistance as with a larger size wire. In other words, two wires are connected in parallel and have each half of the cross-section compared to a benchmark wire. This principle, however, gets to some limits regarding economic considerations, such as the cost of fine wires relative to standard wires, and regarding reliability issues, because handling of extremely fine wires with diameters of less than 100 μm is cumbersome.

Figure 8:
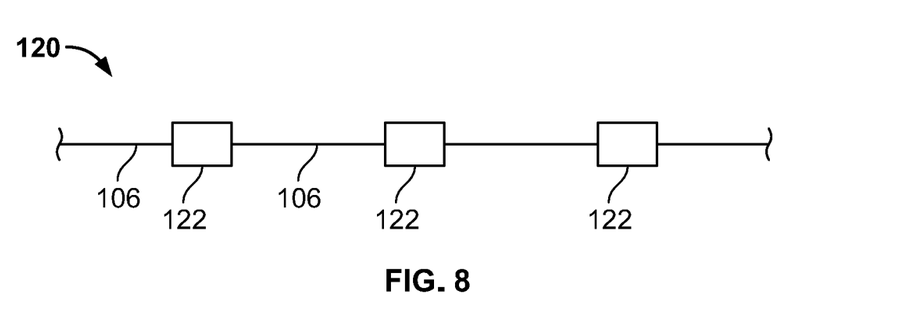
FIG. 8 is a schematic diagram of a heating unit according to another embodiment.

In addition to only using the electrically conductive lead 106 as the heating unit 120, additional heating elements 122 can also be provided, as shown in FIG. 8. In an embodiment, the electrically conductive lead 106 generates only negligible amounts of heat. The main part of the heat is generated by the additional heating elements 122. The heating elements 122 may for instance be formed from semiconductor heating elements. The electrically conductive leads 106 that are interconnecting the heating elements 122 may either be formed as sections of wire, or by film-shaped electrically conductive leads. Any of the diameters explained with reference to FIG. 6 can be employed. In an embodiment, the semiconductor heating elements 122 may have a positive temperature coefficient (PTC) so that an inherent overheating protection is provided.

In an embodiment, sensors may be added to the heat shrink component. These sensors can be configured to monitor and/or drive the heating and shrinking process and give feedback for instance to the cable jointer and/or the electric drive system e. g. whether the installation has been finished successfully. In particular, when realizing the heating unit 120 as a thin film arrangement 116, the sensors and the heating unit 120 can be formed on a common flexible substrate that is attached to the sleeve.

For all of the above illustrated arrangements of electrically conductive leads 106, the present invention proposes spreading the heat generated by the electrically conductive leads 106 around the circumference of the heat shrink layer 108. A heat spreading layer 124, shown in FIG. 9, allows for a more even and faster energy input into the heat shrink layer 108. Furthermore, if the heat spreading layer 124 is arranged between the electrically conductive leads or heating wires 106 and the heat shrink layer 108, it also avoids heat spikes and potential damage to the heat shrink layer 108.

Figure 9:
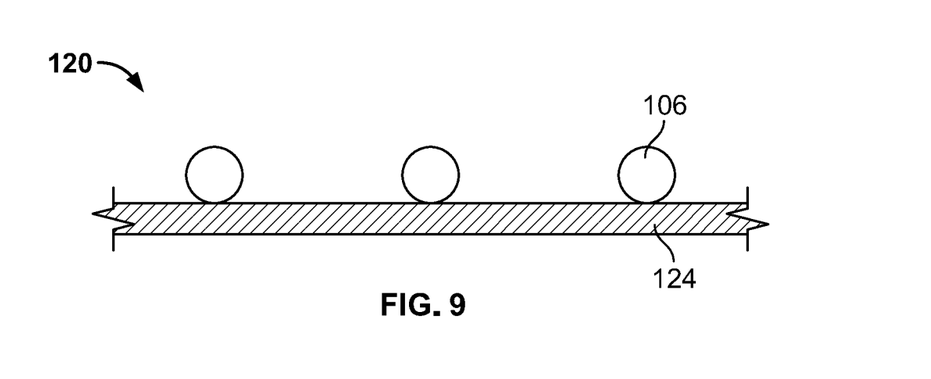
FIG. 9 is a sectional schematic diagram of a heating unit according to another embodiment.

As shown in FIG. 9, the heating unit 120 comprises (at least in particular areas of the heat shrink component 100) a heat spreading layer 124. The heat spreading layer 124 may, for instance, be formed from metal, such as copper or aluminum, or from a polymer which is provided with an enhanced thermal conductivity by adding suitable fillers.

The heat spreading layer 124 may also comprise alternatively or additionally one or more metallic layers. The electrically conductive leads or heating wires 106 should not come into direct contact with each other or an electrically conductive surface in order to avoid local short circuits that would influence the overall resistance of the entire heating system. Consequently, in case a metallic heat spreading layer 124 is provided in contact with the conductive leads 106, the individual leads 106 may for instance be covered with a thin electrically insulating layer. In an exemplary arrangement, the heating wires 106 may be attached to a heat shrink sleeve of a joint body in an axial direction (as shown in FIG. 2), have a diameter of less than 400 μm and be circumferentially spaced from each other by about 5 mm to 30 mm. With this arrangement, a single film of copper or aluminum as the heat spreading layer 124 having a thickness of less than 400 μm is sufficient to remarkably contribute to an even shrinkage around the circumference of the joint body.

Figure 10:
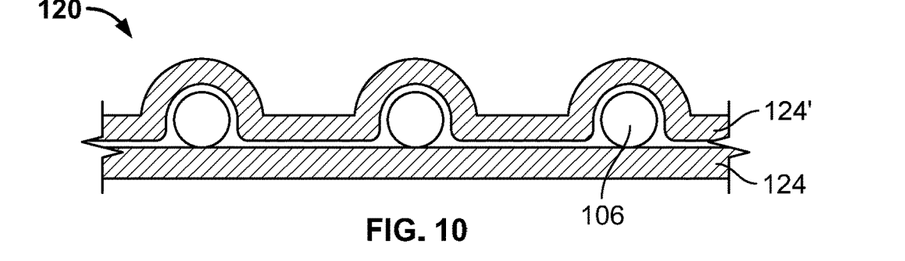
FIG. 10 is a sectional schematic diagram of a heating unit according to another embodiment.

In another embodiment, shown in FIG. 10, a second heat spreading layer 124' is arranged to cover the electrically conductive leads 106.

Figure 11:
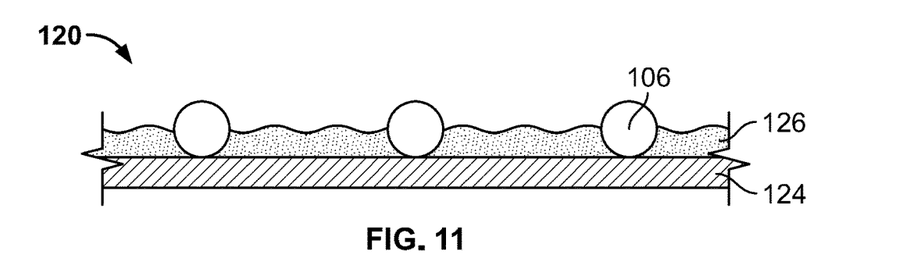
FIG. 11 is a sectional schematic diagram of a heating unit according to another embodiment.

In another embodiment shown in FIG. 11, the electrically conductive leads 106 may at least partly be embedded within an embedding material 126. The embedding material 126 may for instance comprise an adhesive, a hot melt material, mastic, or a lubricant, or any other suitable material which at least partly encloses the electrically conductive lead 106 and improves the heat transfer towards the heat spreading layer 124, as will be explained in more detail with reference to FIGS. 18-24. Additional fillers in the above mentioned materials may improve the effect.

Figure 12:
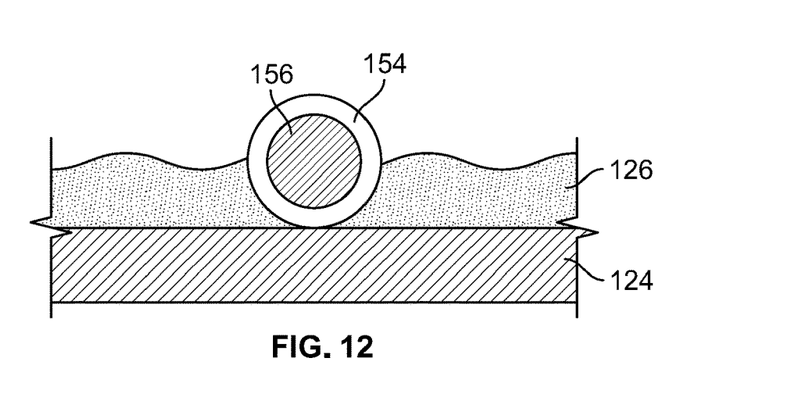
FIG. 12 is a detail of a portion of FIG. 11.

The electrically conductive leads 106, as shown in FIG. 12, may comprise a metal lead 156 forming a core which is covered by an electrically insulating layer 154. This arrangement is advantageous if the leads 106 may come into direct contact with a metal layer forming the upper surface of the heat spreading layer 124.

Figure 13:
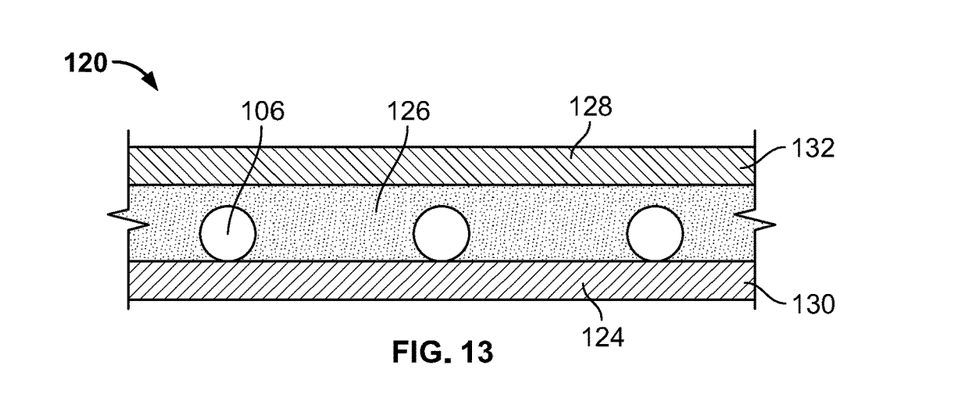
FIG. 13 is a sectional schematic diagram of a heating unit according to another embodiment.

In another embodiment, shown in FIG. 13, the electrically conductive leads 106 are completely surrounded by an embedding material 126. A cover layer 128 is arranged on top of the embedding material 126. As shown in FIG. 13, the heat spreading layer 124 may be formed from an electrically insulating plastic layer 130, and the cover layer 128 is formed from a metal layer 132. Due to the presence of an electrically insulating embedding material 126, the wires 106 do not necessarily have to be coated with an electrically insulating layer, but can be left bare.

Figure 14:
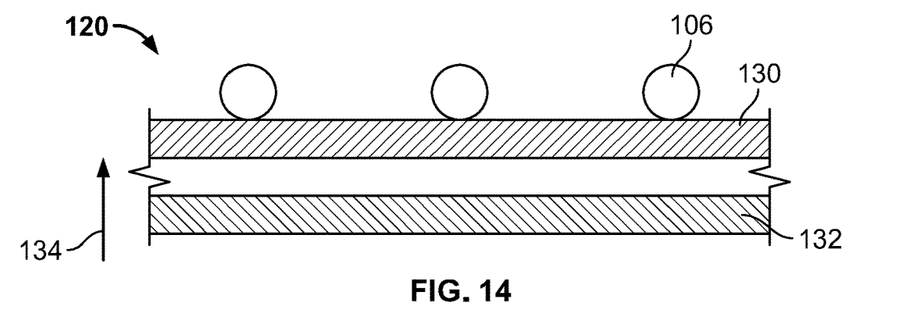
FIG. 14 is a sectional schematic diagram of a heating unit according to another embodiment prior to assembly.
Figure 15:
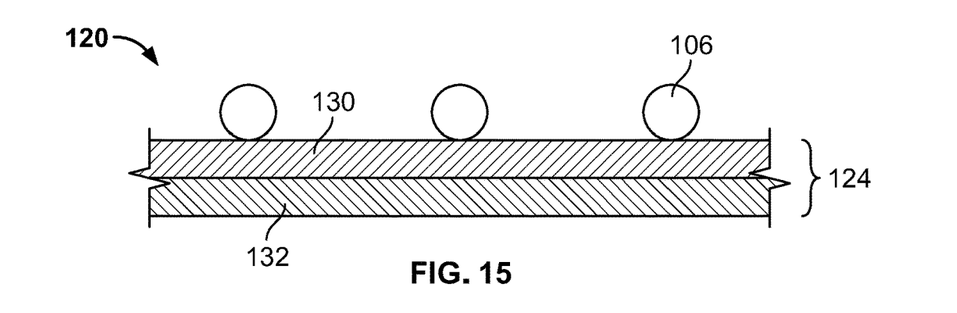
FIG. 15 is a sectional schematic diagram of the heating unit of FIG. 14 fully assembled.

A heating unit 120 according to another embodiment, as shown in FIGS. 14 and 15, allows for the heating wires 106 to avoid having an insulation coating. According to this embodiment, the wires 106 are first attached to a plastic film 130. From the side opposing to the wires 106, a heat spreading metal layer 132 is attached as indicated by the arrow 134. FIG. 15 shows the finally assembled heating unit 120. The heat spreading layer 124 is therefore formed as a double layer comprising at least one metal layer 132 and at least one electrically insulating plastic layer 130.

In an embodiment, the plastic layer 130 is a thermally insulating layer. Meshes or films with cutouts can be used as thermally insulating layers. In another embodiment, a mesh formed from a non-organic fabric can be used as a thermally insulating layer.

Figure 16:
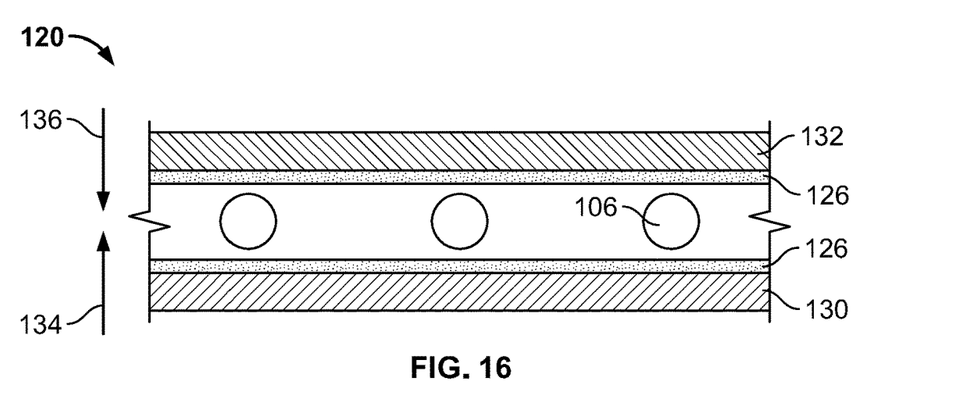
FIG. 16 is a sectional schematic diagram of a heating unit according to another embodiment.

In another embodiment shown in FIG. 16, the metal layer 132 and the plastic layer 130 may both be covered with an adhesive that constitutes an embedding layer 126. The electrically conductive leads 106 are then sandwiched between these two films as indicated by the mounting directions 134 and 136. This embodiment has the advantage that the heating unit 120 can easily be handled. It has to be noted, that according to the present invention, the plastic layer 130 and/or the metal film 132 may function as a heat spreading layer 124. It may be freely chosen whether either the plastic layer 130 or the metal film 132 are arranged between the electrically conductive leads 106 and the heat shrink layer.

Figure 17:
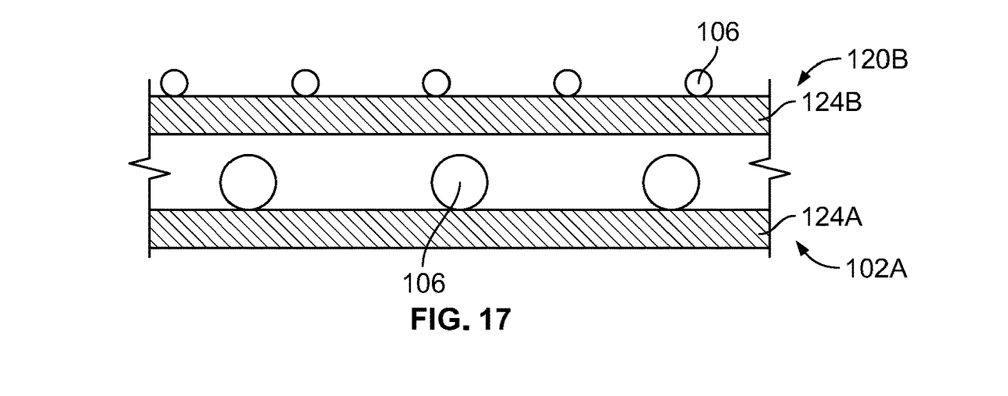
FIG. 17 is a sectional schematic diagram of a heating unit according to another embodiment.

In another embodiment shown in FIG. 17, more than one heating unit 120A, 120B is stacked on top of each other. The heat spreading layer 124A, 124B of each may be formed from metal or plastic films. In order to avoid uncontrolled short circuits, the electrically conductive leads 106 may be coated with an electrically insulating layer if metal films are used.

With reference to FIGS. 18-24, the heat spreading according to the present invention will be explained in more detail for various embodiments of the heat shrink sleeve or component 100.

Figure 18:
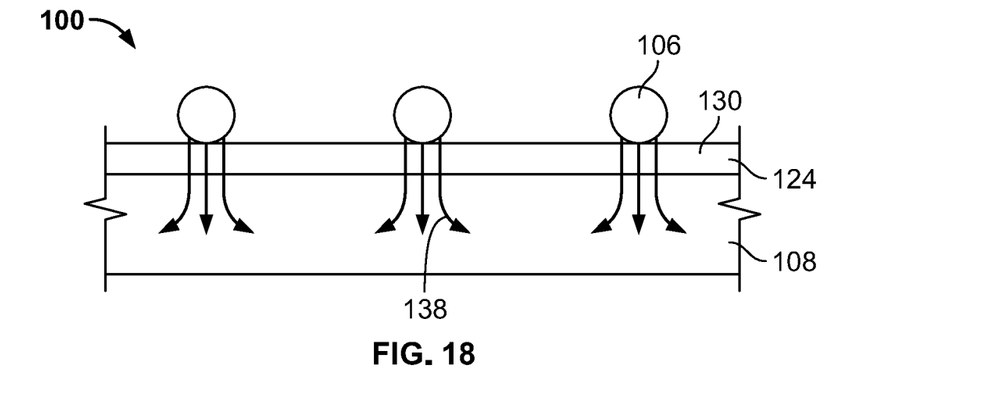
FIG. 18 is a schematic diagram of a heat spreading mechanism of the heating unit of FIG. 9.

FIG. 18 shows a first embodiment, where a heating wire 106 is arranged on a heat shrink layer 108, for instance a heat shrink sleeve, with an additional plastic heat spreading layer 124. As indicated by the arrows 138, the heat flow is deviated in a way that the heat shrink layer 108 does not experience the same temperature peaks as it would experience if in direct contact with the wire 106. Accordingly, damages by excessive heat can be avoided at the heat shrink layer 108.

Figure 19:
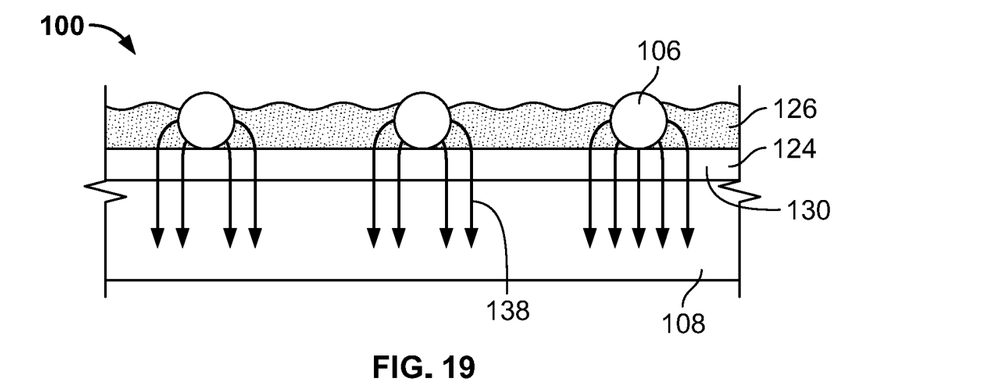
FIG. 19 is a schematic diagram of a heat spreading mechanism of the heating unit of FIG. 11.

When additionally providing a layer of an embedding material 126, as shown in FIG. 19, more heat arrives at the heat shrink layer 108 and the heat is more evenly distributed. The electrically conductive leads 106 do not have to be electrically insulated, if the embedding material 126 and the heat spreading layer 124 are electrically insulating. In an embodiment, however, an insulation is provided for reliability reasons.

Figure 20:
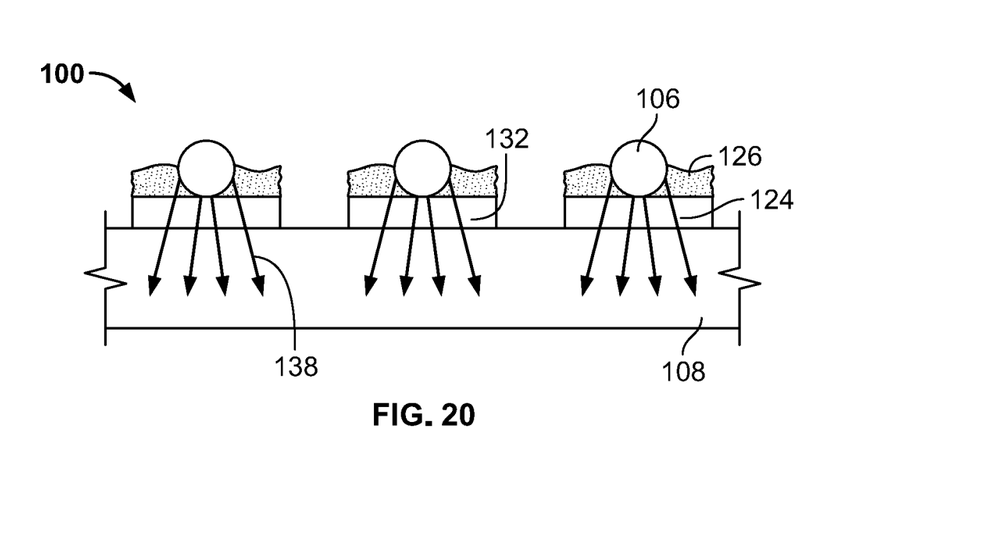
FIG. 20 is a schematic diagram of a heat spreading mechanism of a heating unit according to another embodiment.

With respect to the embodiments explained above it was always assumed that the heat spreading layer 124 is a continuous layer which covers a larger part of the heat shrink layer 108. However, as shown in FIG. 20, the heat spreading material 124 may also only be provided close to the electrically conductive leads 106. The heat spreading material 124 is formed by traces of metal film 132 directly underlying the electrically conductive wires 106. In an embodiment, an adhesive forms the embedding material 126 which at least partly surrounds the wires 106 and facilitates handling during the manufacturing process.

As can be seen from a comparison with FIG. 19 where a plastic layer 130 is used, the arrangement according to FIG. 20 achieves almost the same degree of heat spreading, and in particular avoids spikes of high temperature at the heat shrink layer 108 to about the same degree. If the heat spreading layer is positioned only locally as shown in FIG. 20, then its thickness, in an embodiment, is below 1 mm.

Figure 21:
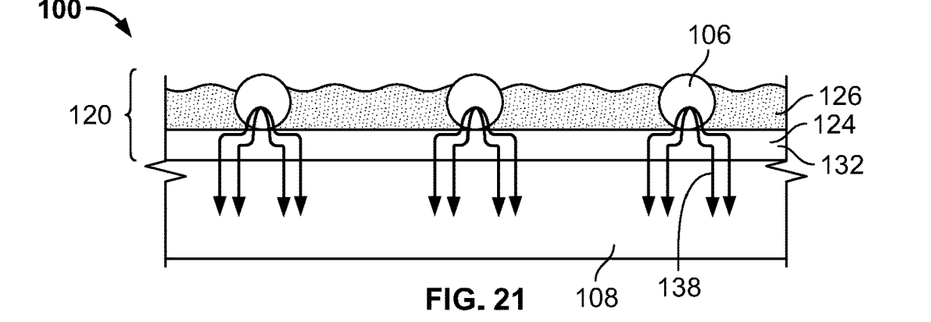
FIG. 21 is a schematic diagram of a heat spreading mechanism of a heating unit according to another embodiment.

FIG. 21, on the other hand, shows an arrangement with a continuous metal film 132 forming the heat spreading layer 124. An embedding material 126 at least partly encompasses the electrically conductive leads 106. As schematically indicated by the arrows 138, the heat flow is distributed in a direction across to the thickness of the metal layer 132 within the plane of the metal layer 132 due to the high thermal conductivity of the material. Moreover, the heat flow is deviated in a way that the heat shrink layer 108 does not experience the same temperature peaks as it would experience if in direct contact with the wire 106. Accordingly, damages by excessive heat can be avoided at the heat shrink layer 108. By additionally providing a layer of an embedding material 126, more heat which is evenly distributed arrives at the heat shrink layer 108. The electrically conductive leads 106 do not have to be electrically insulated, if the embedding material 126 is electrically insulating.

Figure 22:
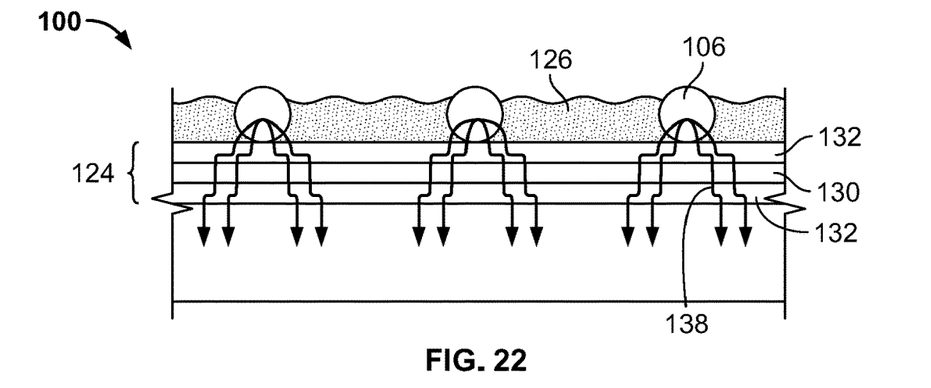
FIG. 22 is a schematic diagram of a heat spreading mechanism of a heating unit according to another embodiment.

Of course, one or more layers with higher and lower thermal conductivity may also be arranged in an alternating manner to form a multilayer heat spreading layer 124, as shown in FIG. 22. According to this example, a heat spreading layer with a high thermal conductivity, for instance a metal layer 132, is arranged on the heat shrink layer 108. The metal layer 132 is covered by a layer with a lower thermal conductivity, for instance a plastic layer 130.

The electrically conductive leads 106 are arranged on a second metal layer 132 which is deposited on top of the plastic layer 130. The electrically conductive leads 106 are embedded at least partially within an embedding material 126. As indicated by the arrow 138, the heat flow is strongly spread by the metal layers 132 within the respective plane of the layer. On its way from the wires 106 to the heat shrink layer 108, the heat is spread quite uniformly so as to provide an even energy input around the circumference of the heat shrink component 100 and to avoid any destructive temperature peaks at the heat shrink layer 108. With this arrangement and also with the arrangements explained referring to the other Figures, the heat spreading layer 124 permits running the heating wires 106 at much higher temperatures, ensuring an accelerated shrinking process taking place more uniformly across the entire product.

Figures 23, 24:
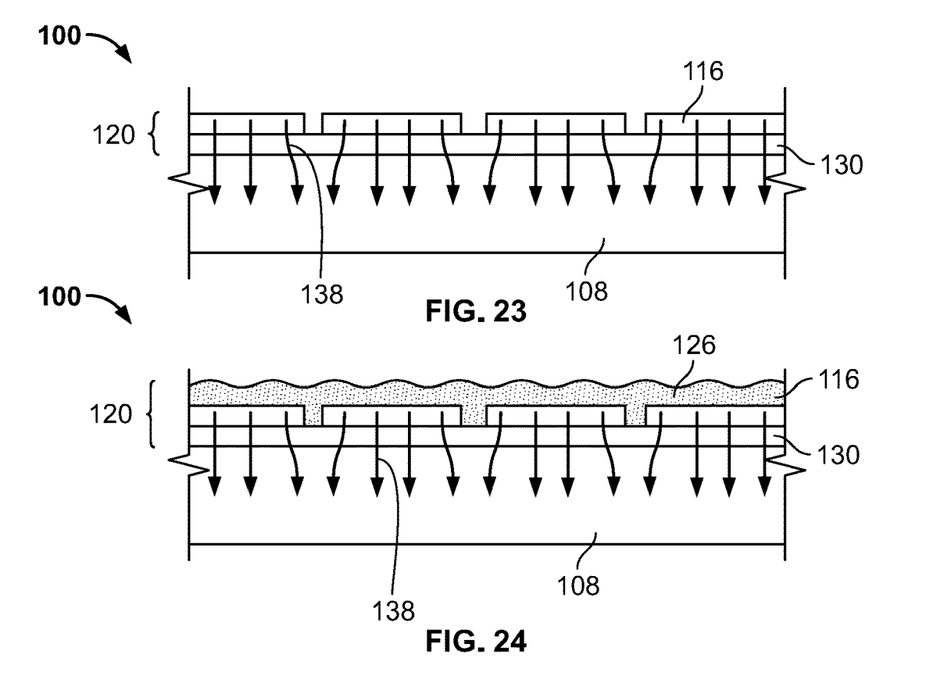
FIG. 23 is a schematic diagram of a heat spreading mechanism of a heating unit according to another embodiment.
FIG. 24 is a schematic diagram of a heat spreading mechanism of a heating unit according to another embodiment.

A similar pattern of the heat distribution can be reached by forming the heating unit 120 from a flexible foil 130 with a printed pattern of electrically conductive film traces 116. The flexible foil 130 may for instance be a polymeric carrier film fabricated from polyimide (PI), comprising copper layers that form the electrically conductive traces 116, as shown in FIG. 23. Due to the fact that the electrically conductive film traces 116 are in contact with its substrate not only along a comparatively small surface area as this is the case with wires having for instance circular cross-sections, the heat is already distributed over a larger area compared to a heating wire 106. Moreover, the PI foil 130 further spreads the generated heat as indicated by the heat flow arrows 138. Of course, an additional cover layer, also fabricated from the same material as the foil 130, may also be added. An additional metal layer arranged between the PI foil 130 and the heat shrink layer 108 (not shown in the Figure) increases heat transfer. Such a metal layer may also support to have only smaller pieces of such a heating system to be arranged on the heat shrink layer 108, thus reducing the costs in some cases. As shown in the embodiment of FIG. 24, the electrically conductive film traces 116 may also be covered by an embedding material 126.

There are commercially available plastic films with different layer thickness of copper (e. g. between 5 μm and 25 μm). These dimensions of course lead to different widths of the conductive films 116, thus covering the circumference to different percentages. In order to create the same cross-section of the film as the copper wires used according to the present invention (e. g. diameter: 0.22 mm, cross-section: 0.038 mm$^2$), the width of the films would be 7.6 mm for a thickness of 5 μm, 4.2 mm for a thickness of 9 μm, and 1.5 mm for a thickness of 25 μm.

Figure 25:
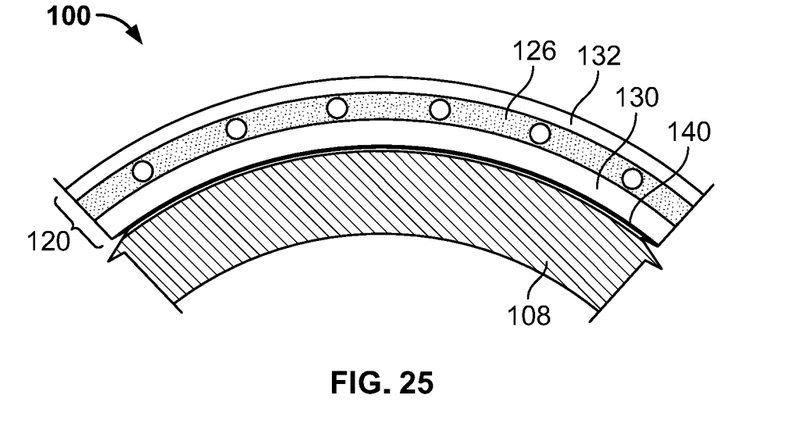
FIG. 25 is a sectional schematic diagram of a heat shrink component according to an embodiment.

An intimate contact between the heating unit 120 and the heat shrink layer 108 is needed for an optimal heat transfer to the heat shrink layer 108. FIG. 25 shows an embodiment where the heating unit 120 is firmly bonded to the heat shrink layer 108 at an interface 140. The heating unit 120 shown in FIG. 25 is structured as shown in FIG. 13 exemplarily. It is clear for a person skilled in the art, however, that any of the other heating units according to the present invention may also be bonded to the surface of the heat shrink layer 108. Unless an adhesive is used for bonding the heating unit 120 to the heat shrink layer 108, the layer of the heating unit 120 which is part of the interface 140 (or at least a surface layer) is a plastic material that can be chemically bound to the surface of the heat shrink layer 108.

Figure 26:
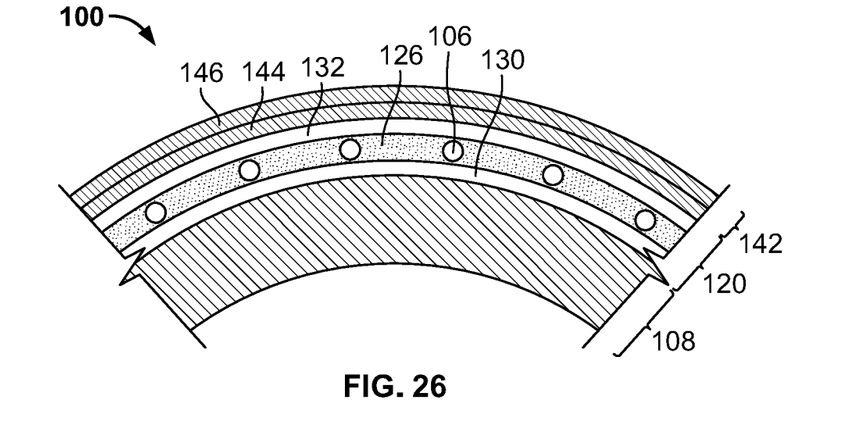
FIG. 26 is a sectional schematic diagram of a heat shrink component according to another embodiment.

In another embodiment, as shown in FIG. 26, one or more additional compressing layers 142 may be provided for pressing the heating unit 120 towards the heat shrink layer 108. Optimally, the compressing layer 142 keeps the heating unit 120 in close contact to the heat shrink layer 108 during the complete heat shrink procedure. The compressing layer 142 exerts a mechanical force directed toward a center of the heat shrink component 100, so that the heating unit always remains in close contact with the heat shrink layer while the diameter of the heat shrink layer diminishes. However, some degree of delamination and therefore loss of the intimate contact can be tolerated and still allows a reasonable shrinking performance because the heating wires 106 also generate a noticeable amount of heating radiation. It is also important to transfer a high amount of heat energy into the heat shrink layer 108 until it starts to contract. After that, a relatively small amount of heat is to be transferred.

Figure 27:
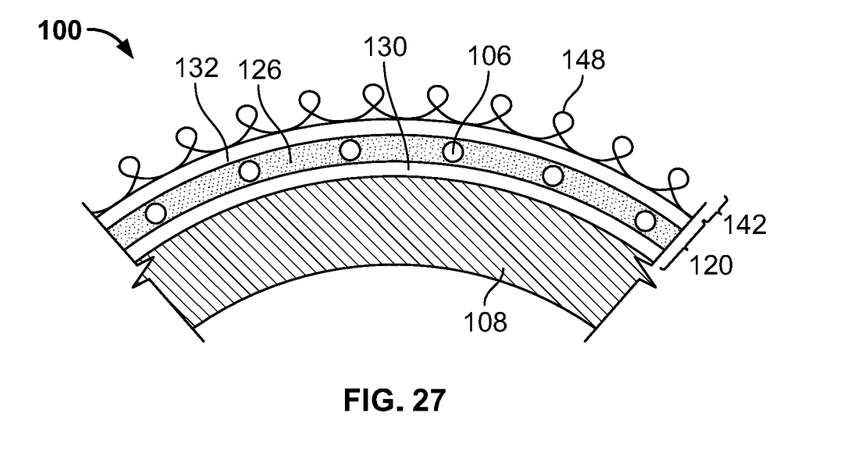
FIG. 27 is a sectional schematic diagram of a heat shrink component according to another embodiment.

As shown in FIG. 26, the compressing layer 142 may comprise a second heat shrink layer 144 and/or a pre-stretched elastomeric layer 146. Additionally, or alternatively, as shown in FIG. 27, the compressing element 142 may comprise a spring 148 or a spring system comprising a plurality of springs for pressing the heating unit 120 onto the heat shrink layer 108. The second heat shrink layer 144 and the pre-stretched elastomeric layer 146 may be formed as more than one short ring.

Figure 28:
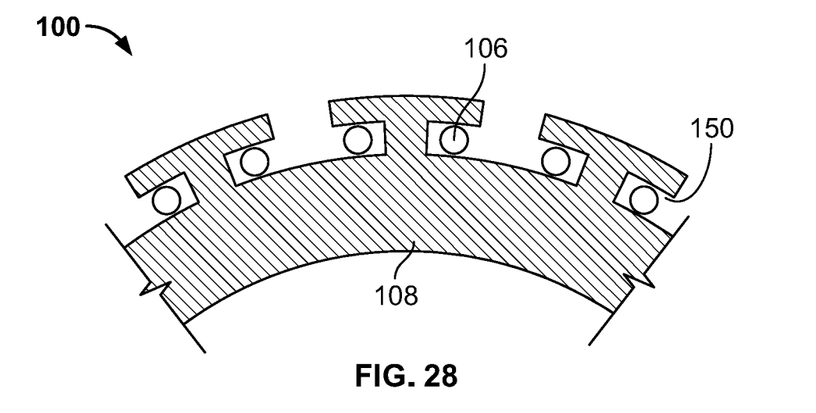
FIG. 28 is a sectional schematic diagram of a heat shrink component according to another embodiment.
Figure 29:
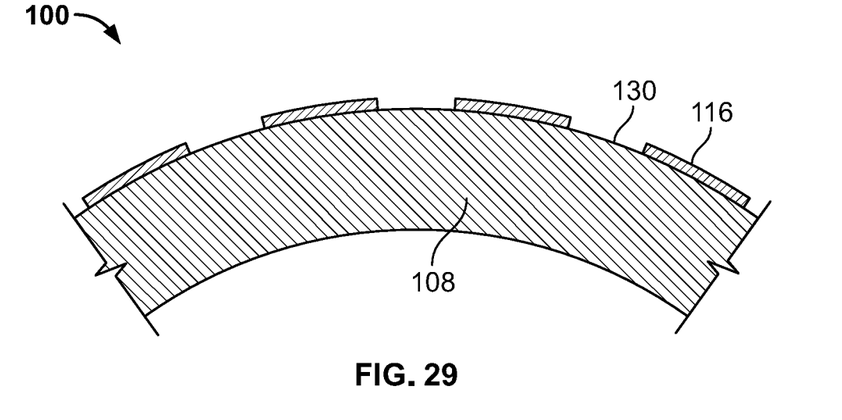
FIG. 29 is a sectional schematic diagram of a heat shrink component according to another embodiment.
Figure 30:
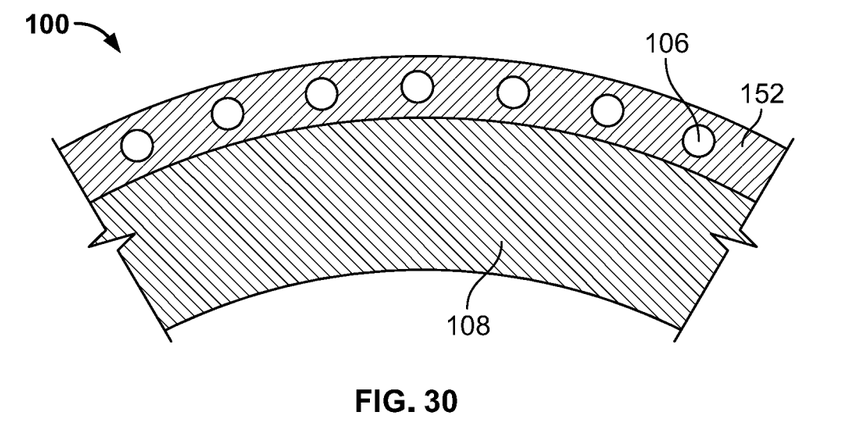
FIG. 30 is a sectional schematic diagram of a heat shrink component according to another embodiment.

FIGS. 28-30 show examples of how the electrically conductive lead 106 can be brought into tight, albeit heat spreading contact with the heat shrink layer 108.

Firstly, as shown in FIG. 28, the electrically conductive lead 106 may be received in accordingly formed recesses 150 of the heat shrink layer 108, thereby establishing a form fit. Moreover, the electrically conductive leads 106 can be embedded in an embedding material (not shown in this Figure). A heat spreading layer (not shown in the Figure) may be added to encompass the arrangement.

In case that the electrically conductive lead is formed by an electrically conductive film 116, same can be attached to the heat shrink layer 108 directly or via an electrically insulating film 130, as shown in FIG. 29. For instance, a thin, structured metal film 116 can be bonded to the surface, or the conductors 116 are printed onto the surface of the heat shrink layer 108. Alternatively, as this is known for printed circuit board (PCB) fabrication, the surface of the heat shrink layer 108 may also be coated with a metal layer which is then patterned by means of an etching step.

Furthermore, as shown in FIG. 30, the electrically conductive leads 106 may also be embedded within an embedding material and/or additional heat shrink layer 152 that is in tight contact with the heat shrink layer 108. The embedding step may for instance be performed by co-extrusion.

With any of the embodiments explained above, air pockets have to be avoided because the air expands from room temperature to 120° C. and above remarkably, resulting in air bubbles that are large enough to hinder a sufficient heat spreading and/or generate unwanted deformations of the heat shrink component 100. Thus, the heat shrink component 100 may be damaged unless the presence of air bubbles is avoided to a sufficient extent.

The embodiments of the present invention are capable of shrinking widely used energy products, like LV, MV, and even HV joint bodies, terminations, sleeves (such as rejacketing sleeves), and molded parts (such as break out boots and caps) without using an open flame and instead using electrical energy. Because the application typically is a field installation, the power source beneficially uses batteries, either available in the van of the cable jointer staff or to be carried to the place of installation. Alternatively, a generator, either available in the van or transportable over limited distances, can be used. For safety reasons, the voltage can be limited to values in the magnitude of 20 V, at maximum 24

V. In order to be compatible with installation times that are reached using open flames, the shrink times of a typical MV joint body should not exceed a maximum of 10 minutes.

The present invention can be employed with the following exemplary specific dimensions and characteristics.

Although any kind of heating wires 106 can be used, the conductivity of the wires 106, in an embodiment, is at least $3 \cdot 10^7$ S/m. The power source provides a voltage that is a DC voltage below 60 V or an AC voltage of 25 V RMS.

A cross-sectional area of the heating conductor 106 is between 0.007 mm² and 0.8 mm², equaling to wires 106 of 0.1 to 1.0 mm diameter. Conductive films 116 must have according dimensions, typically these films have thicknesses in the range of 5 µm to 25 µm. The temperature of the conductor during the heating is at least 120° C., max. 450° C., for a heating time of 20 minutes or less. The value of 120° C. is a typical shrink temperature for heat shrink products. There are variants that shrink at 110° C. and a very special material which is not used on energy products starts to shrink at 65° C. Given temperature losses to the environment, the temperature of the conductors must be far above 120° C.

The above parameters define a broad working space. Depending on the geometry of the heat shrink product and the conductors 106, the heating system can be defined for instance according to the following examples.

A typical MV joint body has a wall thickness of 3.5 mm of the heat shrink layer (plus elastomeric layer), a length of 420 mm and an outer diameter of 68 mm (surface area is 9 dm²). In successful trials six heating units 120 with 3.3 meter of wire each (diameter 0.22 mm) were used. With a power source providing 24 V, these six heating units 120 were connected in parallel and heated up to 200° C. to 350° C. temperature of the wires 106. The shrink time was 10 min, using thermal insulation and heat spreading.

If the wire 106 diameters are chosen smaller, then each heating unit 120 must have less meters of wire 106. Accordingly, more than six heating units 120 are to be configured to allow a 24 V power source to heat up the heat shrink component to the required temperatures. In an embodiment, a circumferential distance between heating wires 106 may be below 50 mm, such as below 20 mm, in the non-recovered condition, reducing any issues with distributing the heating energy.

If another heat shrink product has less surface area, then a lower number of heating units 120 (thus less meters of wire) are needed.

If another heat shrink product has a lower wall thickness, then a comparably lower number of heating systems and less meters of wire are needed. The dependency on the wall thickness does not seem linear. It appears that even a stack of multiple heat shrink sleeves resulting in 10 mm total wall thickness can be heated with about the same settings as the typical MV joint body having a wall thickness of 3.5 mm. There is, of course, a dependency on the overall shrink behavior of the particular heat shrink material. By adapting the composition of the heat shrink material, the shrink temperature and the ease of shrinking can be varied.

What is claimed is:

1. A heat shrink component, comprising:
   a heat shrink layer; and
   a heating unit in thermal contact with at least a part of the heat shrink layer and heating the heat shrink layer to a heat shrink temperature, the heat shrink component having a first dimension in an expanded state and a second dimension in a shrunk state after heating, the first dimension is larger than the second dimension, the heating unit including an electrically conductive lead heated by an electrical current flowing through the electrically conductive lead and a heat spreading layer arranged in thermal contact with the electrically conductive lead and distributing a heat generated by the electrically conductive lead, the heat spreading layer is a thermally conductive material that is disposed over an outer surface of the heat shrink layer, the heat spreading layer is arranged at least partly between the electrically conductive lead and the heat shrink layer in a direction perpendicular to the outer surface of the heat shrink layer.

2. The heat shrink component of claim 1, wherein the heat spreading layer has a metal layer and/or a plastic layer and/or a plastic layer with a metal coating.

3. The heat shrink component of claim 1, wherein the heat spreading layer at least partly encompasses the electrically conductive lead and the heat shrink layer.

4. The heat shrink component of claim 1, wherein the heating unit has a thermally insulating layer.

5. The heat shrink component of claim 1, wherein the electrically conductive lead is at least partly embedded within an embedding material.

6. The heat shrink component of claim 5, wherein the embedding material is an adhesive, a hot melt material, a mastic, or a lubricant.

7. The heat shrink component of claim 1, wherein the heating unit is arranged on the outer surface of the heat shrink layer.

8. The heat shrink component of claim 7, further comprising a compressing element, the electrically conductive lead is arranged between the compressing element and the heat shrink layer.

9. The heat shrink component of claim 8, wherein the compressing element presses the electrically conductive lead towards the heat shrink layer at least partly while the heat shrink layer is heated.

10. The heat shrink component of claim 9, wherein the compressing element includes a spring and/or an elastomeric layer and/or a second heat shrink layer.

11. The heat shrink component of claim 1, wherein the electrically conductive lead has an electrical conductivity greater than $1 \cdot 10^7$ S/m.

12. The heat shrink component of claim 1, wherein the heat shrink layer is formed at least partly as a sleeve with a longitudinal axis, the sleeve covering an electrical connection.

13. The heat shrink component of claim 1, wherein the electrically conductive lead is an electrically conductive film.

14. The heat shrink component of claim 1, wherein the electrically conductive lead is a metal wire having a cross-section with a round, oval, or polygonal shape.

15. The heat shrink component of claim 1, wherein the electrically conductive lead includes copper and/or aluminum.

16. The heat shrink component of claim 1, wherein the heat spreading layer includes a metal material.

17. A method of assembling a heat shrink component, comprising:
   providing a heat shrink component in an expanded state, the heat shrink component including a heat shrink layer and a heating unit in thermal contact with at least a part of the heat shrink layer, the heating unit including an electrically conductive lead and a heat spreading layer arranged in thermal contact with the electrically conductive lead and distributing a heat generated by the electrically conductive lead, the heat spreading layer is a thermally conductive material that is disposed over an outer surface of the heat shrink layer, the heat spreading layer is arranged at least partly between the electrically conductive lead and the heat shrink layer in a direction perpendicular to the outer surface of the heat shrink layer;

connecting an electrical power source to the heating unit; and heating the heat shrink layer to a heat shrink temperature with the heating unit, the heat shrink component shrinking from a first dimension in the expanded state to a second dimension in a shrunk state, the first dimension is larger than the second dimension.

18. The method of claim 17, wherein an electric power fed into the electrically conductive lead is reduced over time during the heating step.

19. The method of claim 17, wherein the electrical power source provides a DC voltage that is below 60 V or an AC voltage of 25 V RMS to heat the heat shrink component to a temperature of at least 120° C. during a heating time of 20 minutes or less.

20. The heat shrink component of claim 5, wherein the embedding material is different from the heat spreading layer and is disposed on a side of the heat spreading layer opposite the outer surface of the heat shrink layer.

* * * * *